(12) United States Patent
Wasserman

(10) Patent No.: US 12,326,099 B2
(45) Date of Patent: Jun. 10, 2025

(54) BATHTUB SEAL INTEGRATED INTO CMC VANE LOAD PATH

(71) Applicant: RTX CORPORATION, Farmington, CT (US)

(72) Inventor: David J. Wasserman, Hamden, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/452,912

(22) Filed: Aug. 21, 2023

(65) Prior Publication Data

US 2025/0067182 A1    Feb. 27, 2025

(51) Int. Cl.
*F01D 5/18* (2006.01)
*F01D 5/28* (2006.01)
*F02C 7/28* (2006.01)

(52) U.S. Cl.
CPC .............. *F01D 5/18* (2013.01); *F01D 5/282* (2013.01); *F02C 7/28* (2013.01); *F05D 2260/232* (2013.01); *F05D 2300/6033* (2013.01)

(58) Field of Classification Search
CPC . F01D 5/18; F01D 5/147; F01D 5/188; F01D 5/189; F01D 9/06; F01D 9/065
See application file for complete search history.

(56) References Cited

U.S. PATENT DOCUMENTS

| | | |
|---|---|---|
| 3,301,527 A | 1/1967 | Kercher |
| 5,145,315 A | 9/1992 | North et al. |
| 5,630,700 A | 5/1997 | Olsen et al. |
| 6,019,572 A | 2/2000 | Cunha |
| 6,382,906 B1 | 5/2002 | Brassfield et al. |
| 6,464,456 B2 | 10/2002 | Darolia et al. |
| 8,393,867 B2 | 3/2013 | Chon et al. |
| 10,612,397 B2 | 4/2020 | Matsuo et al. |

(Continued)

FOREIGN PATENT DOCUMENTS

JP    2012246785 A    12/2012

OTHER PUBLICATIONS

European Search Report for EP Application No. 24195731.5 dated Feb. 4, 2025.

(Continued)

*Primary Examiner* — Thuyhang N Nguyen
(74) *Attorney, Agent, or Firm* — Carlson, Gaskey & Olds, P.C.

(57) ABSTRACT

A vane assembly includes a vane having an outer platform with mount structure and an airfoil extending inwardly from the mount structure and formed of ceramic matrix composites ("CMC"). The vane has an internal cooling chamber. A metal baffle is received within the internal cooling chamber and extends beyond the platform. A bathtub seal has a central portion receiving the metal baffle. The metal baffle has a central chamber and cooling air holes to deliver cooling air into the internal cooling chamber. The bathtub seal has an inner wall and an outer wall outward of the metal baffle. The inner wall, the outer wall and a bottom wall define a bathtub seal chamber. The bottom wall is in contact with an upper surface of the vane. The vane is connected to the outer wall. Static structure is received within the bathtub seal chamber. A gas turbine engine is also disclosed.

20 Claims, 5 Drawing Sheets

(56) References Cited

U.S. PATENT DOCUMENTS

| | | |
|---|---|---|
| 10,774,657 B2 * | 9/2020 | Spangler ................ F01D 9/065 |
| 10,774,665 B2 * | 9/2020 | Greene ................ F01D 11/005 |
| 10,794,289 B2 | 10/2020 | Groves et al. |
| 11,203,981 B1 | 12/2021 | Propheter-Hinckley et al. |
| 11,346,234 B2 * | 5/2022 | Sadler .................... F01D 25/24 |
| 11,454,129 B1 | 9/2022 | Quach et al. |
| 11,473,444 B2 | 10/2022 | Generale et al. |
| 11,486,256 B2 | 11/2022 | Quach et al. |
| 2010/0068034 A1 * | 3/2010 | Schiavo ................ F01D 5/284 |
| | | 29/889.22 |
| 2013/0004320 A1 | 1/2013 | Perret et al. |
| 2017/0081966 A1 | 3/2017 | Huizenga et al. |
| 2017/0198602 A1 * | 7/2017 | Hernandez ............ F01D 11/005 |
| 2020/0149404 A1 | 5/2020 | Kovach et al. |
| 2021/0140341 A1 | 5/2021 | Generale et al. |
| 2021/0317786 A1 | 10/2021 | Sobanski et al. |
| 2022/0082024 A1 | 3/2022 | Sobanski et al. |
| 2022/0372879 A1 | 11/2022 | Blohm et al. |
| 2023/0193769 A1 * | 6/2023 | Whittle .................. F01D 9/042 |
| | | 415/200 |
| 2023/0304412 A1 | 9/2023 | Preuss et al. |

OTHER PUBLICATIONS

European Search Report for EP Application No. 24195707.5 dated Jan. 23, 2025.
European Search Report for EP Application No. 24195725.7 dated Feb. 5, 2025.

* cited by examiner

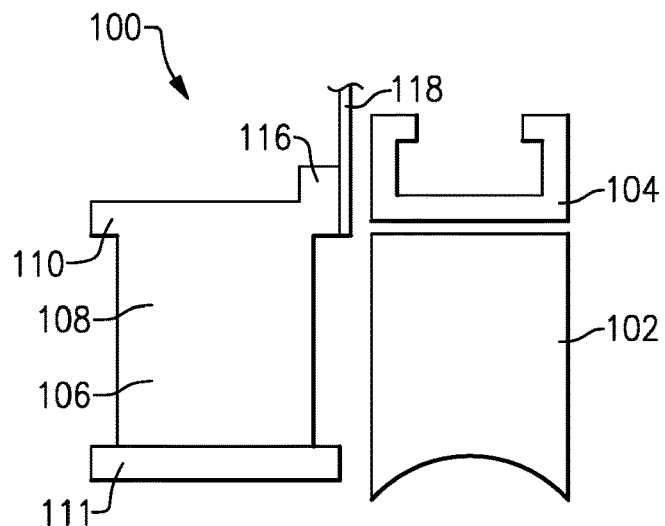
FIG.2A
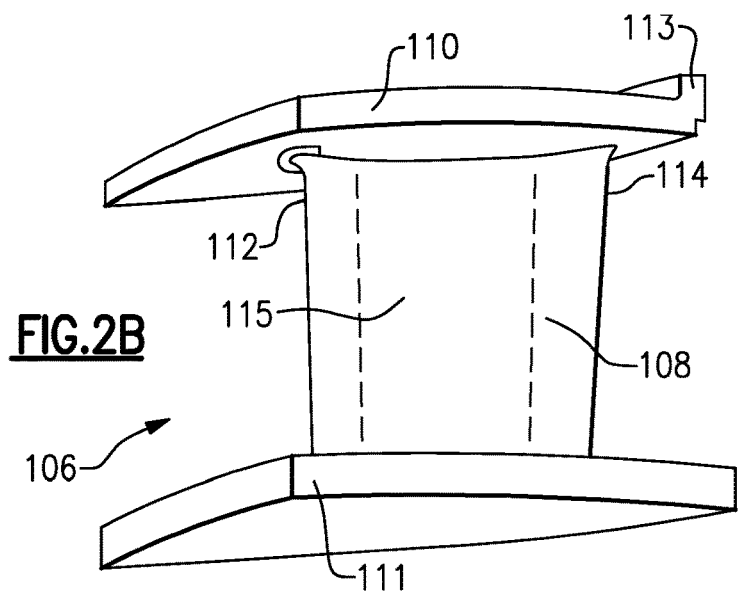
FIG.2B
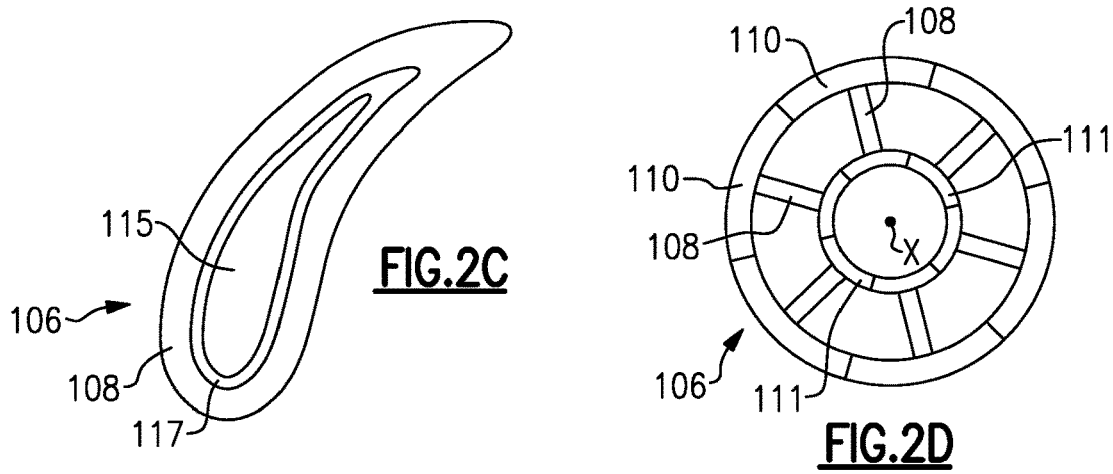
FIG.2C
FIG.2D

BATHTUB SEAL INTEGRATED INTO CMC VANE LOAD PATH

BACKGROUND OF THE INVENTION

This application relates to a CMC turbine vane and internal metal baffle.

Gas turbine engines are known, and typically include a fan delivering air into a bypass duct as propulsion air. The air is also delivered into a compressor and from the compressor into a combustor. The air is mixed with fuel and ignited in the combustor, and products of the combustion pass downstream through turbine rotor stages driving them to rotate. The turbine rotors in turn drives the fan and compressor rotors.

It is known that components in the turbine section of a gas turbine engine see very high temperatures from the products of combustion. As such, various efforts are taken to ensure the components can withstand these temperatures.

One development for forming turbine section components is the use of ceramic matrix composites ("CMCs"). CMCs can withstand very high temperatures. However, they also raise unique manufacturing challenges relative to their metallic counterparts.

SUMMARY OF THE INVENTION

In a featured embodiment, a vane assembly includes a vane having an outer platform with mount structure and an airfoil extending inwardly from the mount structure and formed of ceramic matrix composites ("CMC"). The vane has an internal cooling chamber. A metal baffle is received within the internal cooling chamber and extends beyond the platform. A bathtub seal has a central portion receiving the metal baffle. The metal baffle has a central chamber and cooling air holes to deliver cooling air into the internal cooling chamber. The bathtub seal has an inner wall and an outer wall outward of the metal baffle. The inner wall, the outer wall and a bottom wall define a bathtub seal chamber. The bottom wall is in contact with an upper surface of the vane. The vane is connected to the outer wall. Static structure is received within the bathtub seal chamber.

In another embodiment according to the previous embodiment, the baffle has an upper face and the bathtub seal has a support face.

In another embodiment according to any of the previous embodiments, the upper face and the support face are brazed together.

In another embodiment according to any of the previous embodiments, the vane is mounted into a vane row with the bathtub seal providing support between the vane, the baffle and static structure.

In another embodiment according to any of the previous embodiments, the static structure includes a first vane support having a tab extending into a seal chamber defined between an inner and an outer wall of the bathtub seal.

In another embodiment according to any of the previous embodiments, a mount structure on an upper surface of a vane platform is provided with a coating on an outer surface.

In another embodiment according to any of the previous embodiments, a flange cap extends across an outer wall of the bathtub seal and the mount structure of the vane.

In another embodiment according to any of the previous embodiments, the vane is mounted into a vane row with the bathtub seal providing support between the vane, the baffle and static structure.

In another embodiment according to any of the previous embodiments, the static structure includes a first vane support having a tab extending into a seal chamber defined between an inner and an outer wall of the bathtub seal.

In another embodiment according to any of the previous embodiments, a mount structure on an upper surface of a vane platform is provided with a coating on an outer surface.

In another embodiment according to any of the previous embodiments, a flange cap extends across an outer wall of the bathtub seal and the mount structure of the vane.

In another featured embodiment, a gas turbine engine includes a compressor section, a combustor and a turbine section. The turbine section includes rotating blade rows alternating with static vane rows. The vane rows include a vane assembly having a plurality of vanes with an outer platform having mount structure and an airfoil extending inwardly from the mount structure and the vane formed of ceramic matrix composites ("CMC"). The vane has an internal cooling chamber. A metal baffle is received within the internal cooling chamber and extends beyond the platform. A bathtub seal has a central portion receiving the metal baffle. The metal baffle has a central chamber and cooling air holes to deliver cooling air into the internal cooling chamber. The bathtub seal has an inner wall and an outer wall outward of the metal baffle. The inner wall, the outer wall and a bottom wall define a bathtub seal chamber. The bottom wall is in contact with an upper surface of the vane. The vane is connected to the outer wall. Static structure is received within the bathtub seal chamber.

In another embodiment according to any of the previous embodiments, the baffle has an upper face and the bathtub seal has a support face.

In another embodiment according to any of the previous embodiments, the upper face and the support face are brazed together.

In another embodiment according to any of the previous embodiments, the vane is mounted into a vane row with the bathtub seal providing support between the vane and the baffle and static structure.

In another embodiment according to any of the previous embodiments, the static structure includes a first vane support having a tab extending into a seal chamber defined between an inner and an outer wall of the bathtub seal.

In another embodiment according to any of the previous embodiments, a flange cap extends across an outer wall of the bathtub seal and the mount structure of the vane.

In another embodiment according to any of the previous embodiments, a flange cap extends across an outer wall of the bathtub seal and the mount structure of the vane.

In another embodiment according to any of the previous embodiments, the vane is mounted into a vane row with the bathtub seal providing support between the vane and the baffle and static structure.

In another embodiment according to any of the previous embodiments, a flange cap extends across an outer wall of the bathtub seal and the mount structure of the vane.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 2A schematically shows a turbine section.

FIG. 2B shows a vane in the FIG. 2A turbine section.

FIG. 2C is a cross-sectional view through the vane of FIG. 2B.

FIG. 2D shows a vane row.

DETAILED DESCRIPTION

Figure 1:
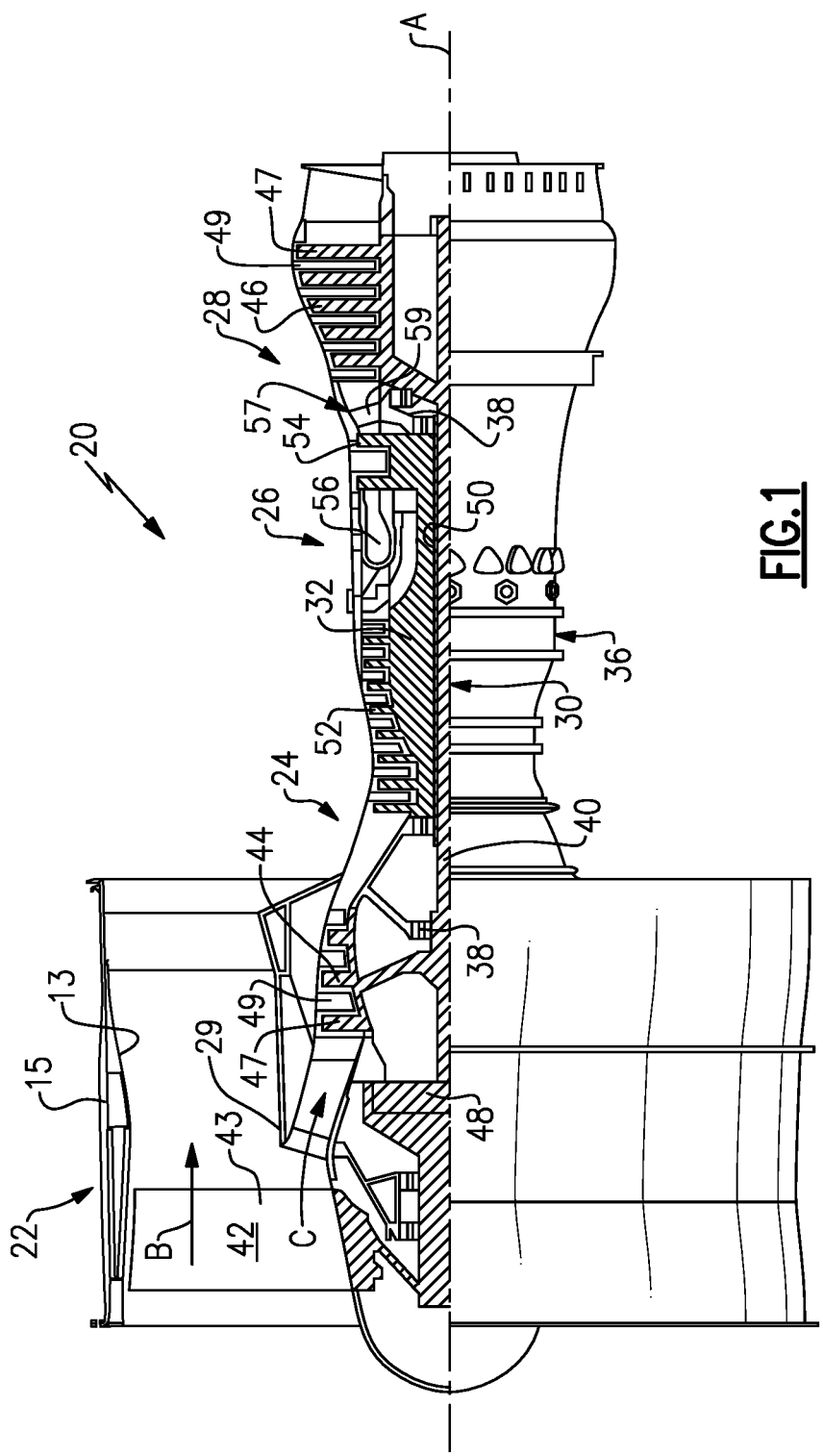
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(T_{ram}° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

FIG. 2A shows a turbine section 100. As known, there are turbine blades 102 rotating in a circumferentially spaced row. A blade outer air seal 104 may be positioned radially outwardly of the blade 102. Static stator vanes 106 are positioned in circumferentially spaced rows axially intermediate rows of turbine blades 102. Each stator vane 106 has an airfoil 108 extending between an outer platform 110 and an inner platform 111. It should be understood that in some cases there need not be an inner platform 111. As shown, on the outer platform 110 there is mount structure 116. Static mount 118 is shown schematically for mounting the vane 106 in the engine.

FIG. 2B shows a stator vane 106 and the airfoil 108 having a leading edge 112 and a trailing edge 114.

As shown schematically, an internal baffle 115 provides cooling air passages within a cooling chamber in the interior of the airfoil 108.

FIG. 2C shows a detail of the baffle 115 sitting in the cooling chamber 117 of the vane 106. As will be shown below, the baffle has internal passages to deliver cooling air into the chamber 117.

FIG. 2D shows the stator vanes 106 aligned in circumferentially spaced locations. As can be seen, there are typically a plurality of individual stator vanes 106 which together extend for 360 degrees about a rotational axis X of the turbine blades 102. In practice there will typically be more vanes 106 than are illustrated here.

Stator vanes according to this disclosure could be formed of any composite material including polymer composites and metal composites, but CMC material and/or a monolithic ceramics are of specific interest and will be the focus of this disclosure. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

The baffle may be formed of a Haynes 188 alloy. However, it should be understood that the teachings of this disclosure would extend to the use of other super alloys, and in particular those that are thermo chemically compatible with CMCs. That is, an alloy that can withstand the elevated temperatures does not react with the silicon in the CMC to create a eutectic metal point and/or result in accelerated oxidation of the alloy.

Figure 3:
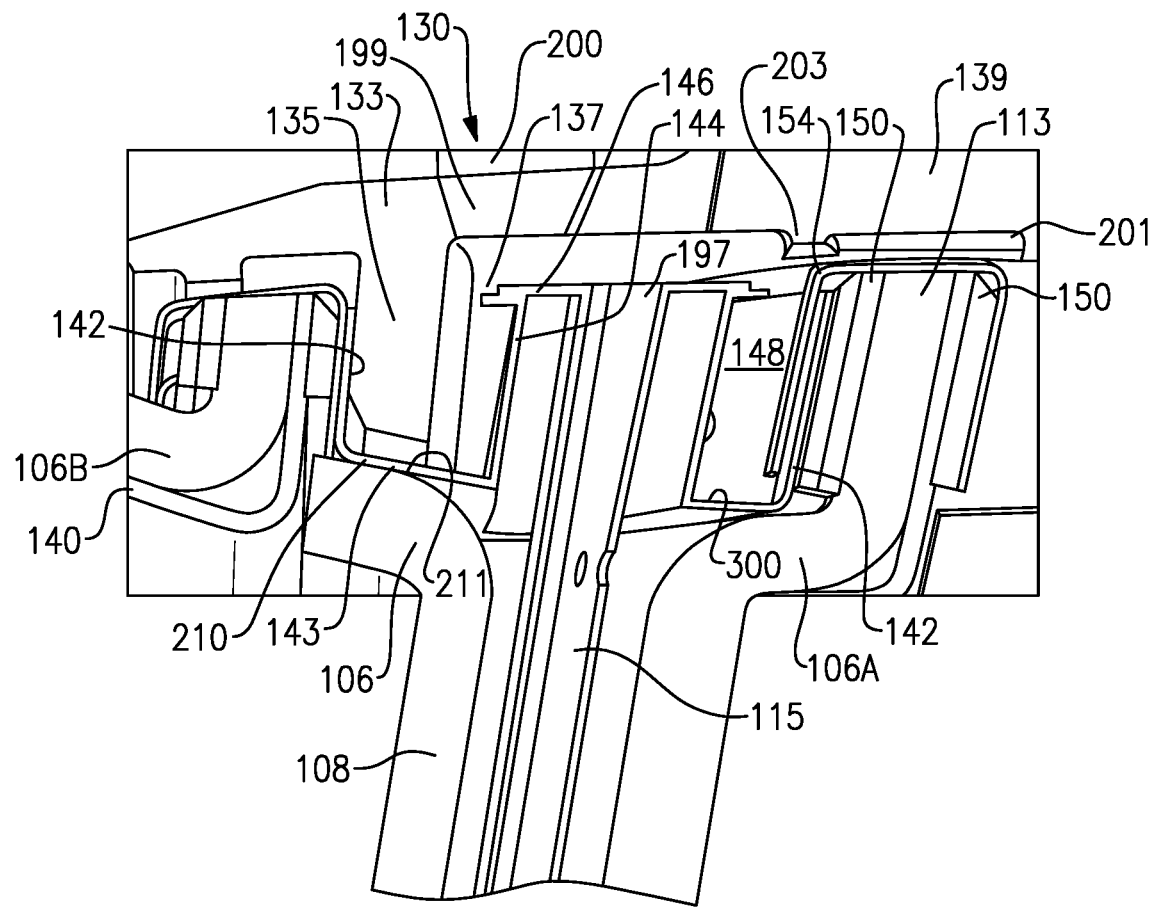
FIG. 3 is a cross-section of an assembly of the vane, an internal baffle, and its mount structure.

There is a common support structure for supporting the vane and the baffle as shown in FIG. 3. Thus, as shown in this Figure, a mount structure 130 includes a vane support 133 having an inner tab 135 moving into a chamber 148 defined between wall 142 and a riser, or wall 144 and base 300 of a component known as a bathtub seal 143.

Mount structure 130 has a flange cap 154 also received within the chamber 148 of the bathtub seal. Flange cap 154 extends across vane mount structure 113 and a wall of bathtub seal 143. Coatings 150 are formed between the flange cap 154 and the mount structure 113. Flange cap 154 is formed of an appropriate metal, such as Haynes 188™, and is in contact with the vane mount structure 113 and the wall of the bathtub seal 143. The mount structure 113 of the vane 106 is connected to the bathtub seal 143 through flange cap 154 secured across an outer wall 144 of the bathtub seal and the mount structure.

As shown in FIG. 3, there are openings 199 and 200 through the support 133 into a chamber 137. Opening 200 communicates with a source of air at a pressure, such as air from the compressor of the associated engine. Chamber 137 supplies air into an opening 197 at an outer end of the baffle 115. This provides cooling air within the vane 106.

A stop 203 is also illustrated holding a plurality of shims 201. Shims 201 control a spacing between an inner wall of a second vane supply support 139 and an upper end of the mount structure 113. There are a plurality of shims which could be removed to control the clearance.

The flange cap 154 extends across a wall of bathtub seal 143 and the mount structure 113. The bathtub seal 143 also provides sealing with the vanes supporting hardware and is constrained and supported by the vane supporting hardware.

The bathtub seal wall 142 seals against a side of an adjacent vane 106A via pressure loading and thermal expansion.

The vertical wall 142 on the opposed side is trapped in a load path between the mount structure 113 of the vane 106B and the support structure. This constraint provides sufficient loading to trap the baffle assembly within the load tap and seal against all mating surfaces, while still allowing the baffle to be cantilevered within the vane cavity and without fixing the baffle to the vane.

When the designer decides to utilize re-staggering with such vane and baffle combinations, a method of achieving this is disclosed in a copending application entitled "CMC VANE WITH ROTATABLE BAFFLE DESIGN TO ACCOMMODATE RE-STAGGER," filed on even date herewith the by Applicant of this application, and identified by Ser. No. 18/452,901.

Figure 4A:
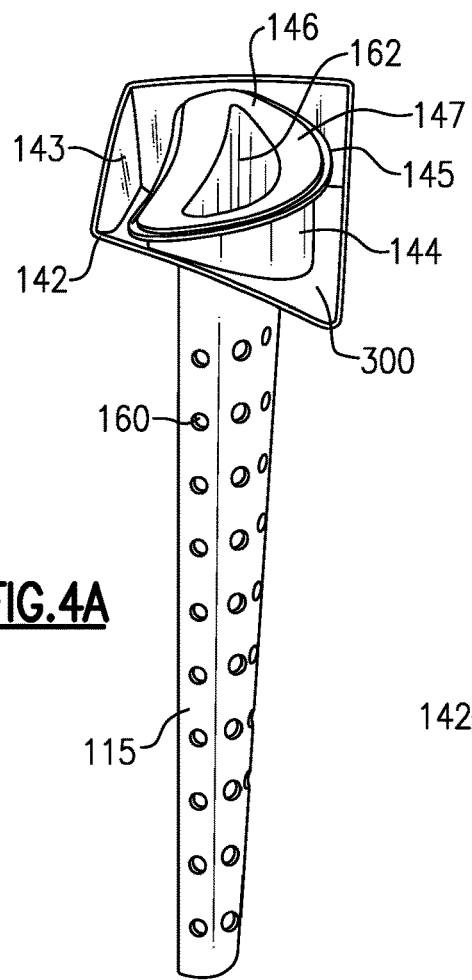
FIG. 4A shows the baffle and a bathtub seal.

FIG. 4A shows details of the baffle 115. The bathtub seal 143 is secured to the baffle. As can be appreciated, the riser 144 has an upper face 145 supporting an upper face 147 of baffle 115. Baffle 115 has cooling holes 160 for delivering air from an internal chamber 162 into the chamber 117 (see FIG. 2C).

Figure 4B:
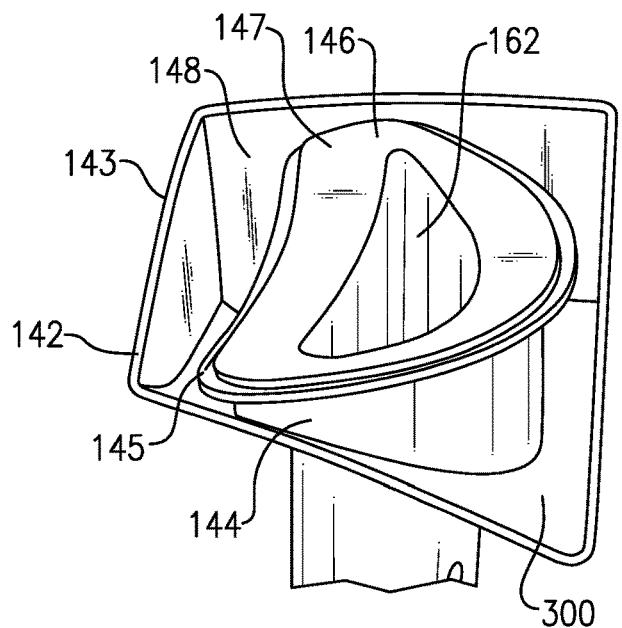
FIG. 4B is a detail of the FIG. 4A baffle and bathtub seal.

FIG. 4B shows further detail of the connection between the upper face 147 and the upper face 145 of bathtub seal 143.

Figure 4C:
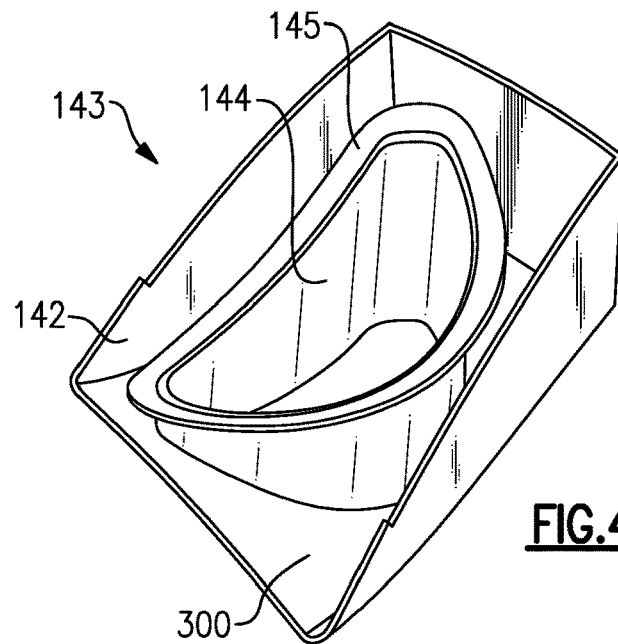
FIG. 4C shows the bathtub seal.

FIG. 4C shows the bathtub seal 143 having wall 142 and riser 144 along with upper or support face 145.

Figure 5:
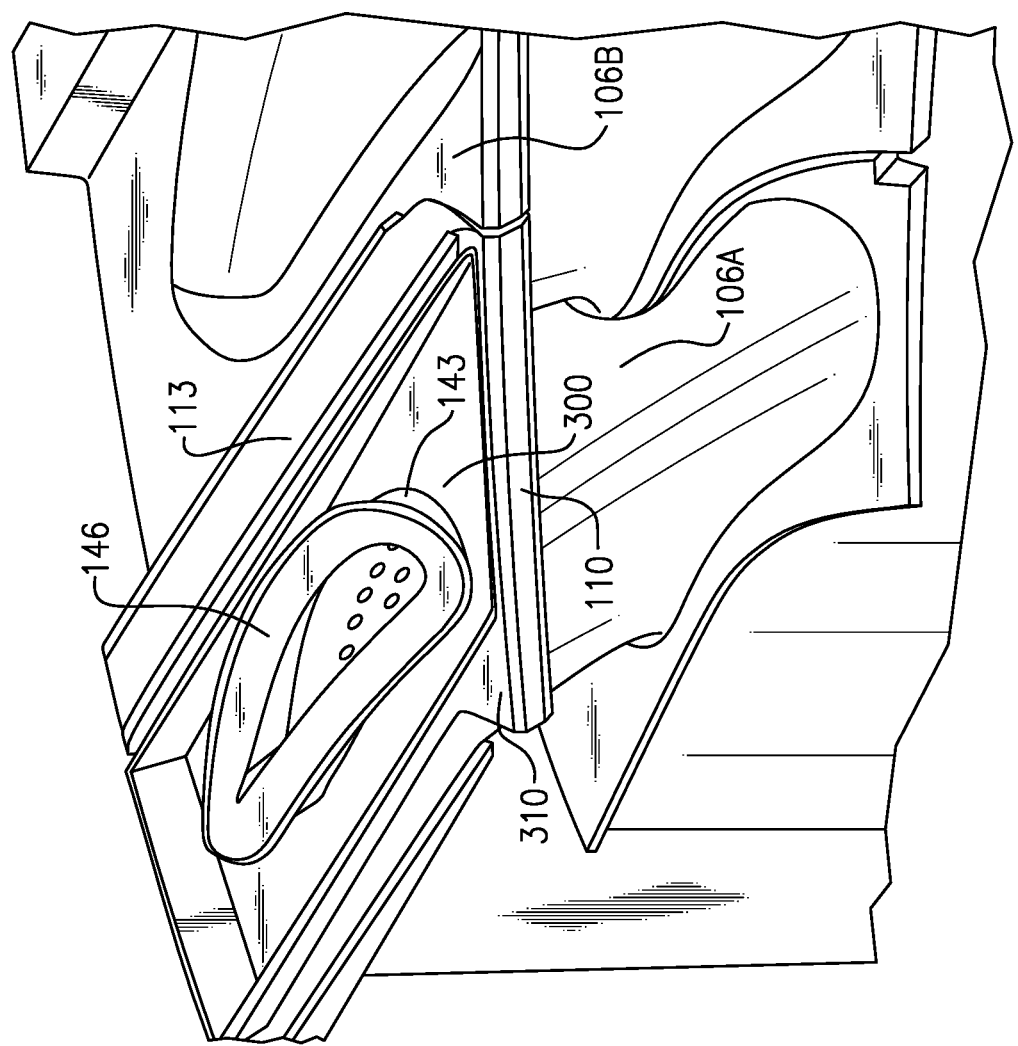
FIG. 5 shows a feature of the vane, baffle and bathtub seal.

FIG. 5 shows another feature of the disclosed bathtub seal 143. As can be seen, there is a vane 106A with an adjacent vane 106B. The platform 110 of the vane 106A is illustrated. As can be seen, the bathtub seal 143 has its base wall 300 covering the majority of a surface area of the platform 110. There is a small tab 310 at one circumferential end of the platform that is not covered. However, the overall surface area of the platform 110 is at least 75% covered by the base wall 300. As can be appreciated, the air moving into chamber 148 is at a higher pressure due to it being compressed. Thus, there is a pressure differential between a radially outer side of the base wall 300 and a radially inner side. This provides a force pushing the base wall 300 down into contact with the platform 110.

A CMC vane, such as vane 106, can have relatively thin and unsupported platforms. Thus, they could be subject to potential modal excitation at various points in the running range of a gas turbine engine. The base wall 300 being biased into contact with the platform 110 provides damping of this modal excitation. The areas of highest challenge are at the edges of the platform, and namely the leading edge, trailing edge suction side and pressure side. Thus, ensuring coverage to be close, if not at, each of those may be valuable.

Details of this feature are disclosed in copending United States Patent Application, entitled "BATHTUB SEAL FOR DAMPING CMC VANE PLATFORM," filed on even date herewith by the Applicant of this application, and identified as Ser. No. 18/452,922.

A vane assembly under this disclosure could be said to include a vane having an outer platform with mount structure and an airfoil extending inwardly from the mount structure and formed of ceramic matrix composites ("CMC"). The vane has an internal cooling chamber. A metal baffle is received within the internal cooling chamber and extends beyond the platform. A bathtub seal has a central portion receiving the metal baffle. The metal baffle has a central chamber and cooling air holes to deliver cooling air into the internal cooling chamber. The bathtub seal has an inner wall and an outer wall outward of the metal baffle, and the inner wall, the outer wall and a bottom wall defining a bathtub seal chamber. The bottom wall is in contact with an upper surface of the vane, and the vane is connected to the outer wall, and static structure received within the bathtub seal chamber.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A vane assembly comprising:
a vane has an outer platform with a mount structure and an airfoil extending inwardly from the mount structure and formed of ceramic matrix composites ("CMC"), the vane having an internal cooling chamber;
a metal baffle received within said internal cooling chamber and extending beyond said platform, a bathtub seal, having a central portion receiving said metal baffle, said metal baffle having a central chamber and cooling air holes to deliver cooling air into said internal cooling chamber, said bathtub seal having an inner wall and an outer wall outward of said metal baffle, and said inner wall, said outer wall and a bottom wall defining a bathtub seal chamber, said bottom wall in contact with an upper surface of said vane, and said vane connected to said outer wall, and a static structure received within said bathtub seal chamber; and
said bottom wall being in contact with the upper surface of the vane over at least 75% of an overall surface area of the upper surface of the vane.

2. The vane assembly as set forth in claim 1, wherein the baffle has an upper face and the bathtub seal has a support face.

3. The vane assembly as set forth in claim 2, wherein the upper face and the support face are brazed together.

4. The vane assembly as set forth in claim 3, wherein the vane is mounted into a vane row with the bathtub seal providing support between the vane, the baffle and static structure.

5. The vane assembly as set forth in claim 4, wherein the static structure includes a first vane support having a tab extending into the bathtub seal chamber defined between an inner and an outer wall of the bathtub seal.

6. The vane assembly as set forth in claim 1, wherein the vane is mounted into a vane row with the bathtub seal providing support between the vane, the baffle and static structure.

7. The vane assembly as set forth in claim 6, wherein the static structure includes a first vane support having a tab extending into the bathtub seal chamber defined between an inner and an outer wall of the bathtub seal.

8. The vane assembly as set forth in claim 1, wherein the mount structure on an upper surface of the vane platform is provided with a coating on an outer surface.

9. The vane assembly as set forth in claim 1, wherein a support surface on the baffle sits outwardly of a support surface on the bathtub seal.

10. A vane assembly comprising:
a vane has an outer platform with a mount structure and an airfoil extending inwardly from the mount structure and formed of ceramic matrix composites ("CMC"), the vane having an internal cooling chamber;
a metal baffle received within said internal cooling chamber and extending beyond said platform, a bathtub seal, having a central portion receiving said metal baffle, said metal baffle having a central chamber and cooling air holes to deliver cooling air into said internal cooling chamber, said bathtub seal having an inner wall and an outer wall outward of said metal baffle, and said inner wall, said outer wall and a bottom wall defining a bathtub seal chamber, said bottom wall in contact with an upper surface of said vane, and said vane connected to said outer wall, and a static structure received within said bathtub seal chamber;
wherein the mount structure on an upper surface of the vane platform is provided with a coating on an outer surface; and
wherein a flange cap extends across an outer wall of the bathtub seal and the mount structure of the vane, said flange cap contacting both the outer wall of the bathtub seal and the mount structure.

11. A gas turbine engine comprising:
a compressor section, a combustor and a turbine section, the turbine section including rotating blade rows alternating with static vane rows, and the vane rows including a vane assembly having a plurality of vanes with an outer platform having a mount structure and an airfoil extending inwardly from the mount structure and the vane formed of ceramic matrix composites ("CMC"), the vane having an internal cooling chamber;
a metal baffle received within said internal cooling chamber and extending beyond said platform, a bathtub seal having a central portion receiving said metal baffle, said metal baffle having a central chamber and cooling air holes to deliver cooling air into said internal cooling chamber, said bathtub seal having an inner wall and an outer wall outward of said metal baffle, and said inner wall, said outer wall and a bottom wall defining a bathtub seal chamber, said bottom wall in contact with an upper surface of said vane, and said vane connected to said outer wall, and a static structure received within said bathtub seal chamber; and
said bottom wall being in contact with the upper surface of the vane over at least 75% of an overall surface area of the upper surface of the vane.

12. The gas turbine engine as set forth in claim 11, wherein the baffle has an upper face and the bathtub seal has a support face.

13. The gas turbine engine as set forth in claim 12, wherein the upper face and the support face are brazed together.

14. The gas turbine engine as set forth in claim 12, wherein the vane is mounted into a vane row with the bathtub seal providing support between the vane and the baffle and static structure.

15. The gas turbine engine as set forth in claim 14, wherein the static structure includes a first vane support having a tab extending into a seal chamber defined between an inner and an outer wall of the bathtub seal.

16. The gas turbine engine as set forth in claim 15, wherein a flange cap extends across an outer wall of the bathtub seal and the mount structure of the vane, said flange cap contacting both the outer wall of the bathtub seal and the mount structure.

17. The gas turbine engine as set forth in claim 14, wherein a flange cap extends across an outer wall of the bathtub seal and the mount structure of the vane.

18. The gas turbine engine as set forth in claim 11, wherein the vane is mounted into a vane row with the bathtub seal providing support between the vane and the baffle and static structure.

19. The gas turbine engine as set forth in claim 18, wherein a flange cap extends across an outer wall of the bathtub seal and the mount structure of the vane, said flange cap contacting both the outer wall of the bathtub seal and the mount structure.

20. The gas turbine as set forth in claim 11, wherein a support surface on the baffle sits outwardly of a support surface on the bathtub seal.

* * * * *